United States Patent [19]

Rasor et al.

[11] Patent Number: 4,911,348

[45] Date of Patent: Mar. 27, 1990

[54] ADJUSTABLE CROSS RAIL FOR LUGGAGE CARRIER

[75] Inventors: William A. Rasor, Goodells; Craig Stapleton, Port Huron, both of Mich.

[73] Assignee: Huron/St. Clair Company, Port Huron, Mich.

[21] Appl. No.: 192,263

[22] Filed: May 3, 1988

[51] Int. Cl.⁴ .............................. B60R 9/04
[52] U.S. Cl. ........................ 224/321; 224/316; 224/324; 224/325; 224/326; 403/61; 403/381; 410/104; 292/257; 248/503.1; 211/94
[58] Field of Search ............ 224/273, 281, 42.01, 224/309, 310, 315, 316, 319–321, 324–326, 329, 331, 917, 247, 250, 254, 255, 270, 272; 403/381, 61, 76; 292/257; 296/3, 180.1; 410/104, 105, 116; 248/503.1; 211/94, 103, 94.5, 162; 12/120.5; 294/143, 147, 162, 166

[56] References Cited

U.S. PATENT DOCUMENTS

| | | | |
|---|---|---|---|
| 3,259,284 | 7/1966 | Olson | 224/247 X |
| 3,554,416 | 1/1971 | Bott | 224/321 |
| 3,713,616 | 1/1973 | Bowers | 410/105 |
| 4,099,658 | 7/1978 | Bott | 224/42.42 R |
| 4,101,061 | 7/1978 | Sage et al. | 224/322 |
| 4,182,471 | 1/1980 | Bott | 224/326 |
| 4,185,799 | 1/1980 | Richards, Jr. | 244/118.5 R |
| 4,270,681 | 6/1981 | Ingram | 224/321 |
| 4,323,182 | 4/1982 | Bott | 224/321 |
| 4,448,337 | 5/1984 | Cronce | 224/321 |
| 4,469,261 | 9/1984 | Stapleton et al. | 224/321 |
| 4,473,178 | 9/1984 | Bott | 224/324 |
| 4,500,020 | 2/1985 | Rasor | 224/321 |
| 4,516,710 | 5/1985 | Bott | 224/324 |
| 4,588,117 | 5/1986 | Bott | 224/321 |

Primary Examiner—Henry J. Recla
Assistant Examiner—R. M. Fetsuga
Attorney, Agent, or Firm—Edgar A. Zarins; Malcolm L. Sutherland

[57] ABSTRACT

An adjustable cross rail for a luggage carrier which utilizes a self-storing lever to release the rail stanchions. The stanchions cooperate with a longitudinal track which receives an adjustable slide bar threadably connected to the release lever. The track is clampingly engaged between the slide bar and the bottom of the stanchion to prevent movement of the stanchion. The clamping and unclamping of the slide bar can be controlled by either a camming lever or a wrench lever, both of which store within the stanchion body.

20 Claims, 8 Drawing Sheets

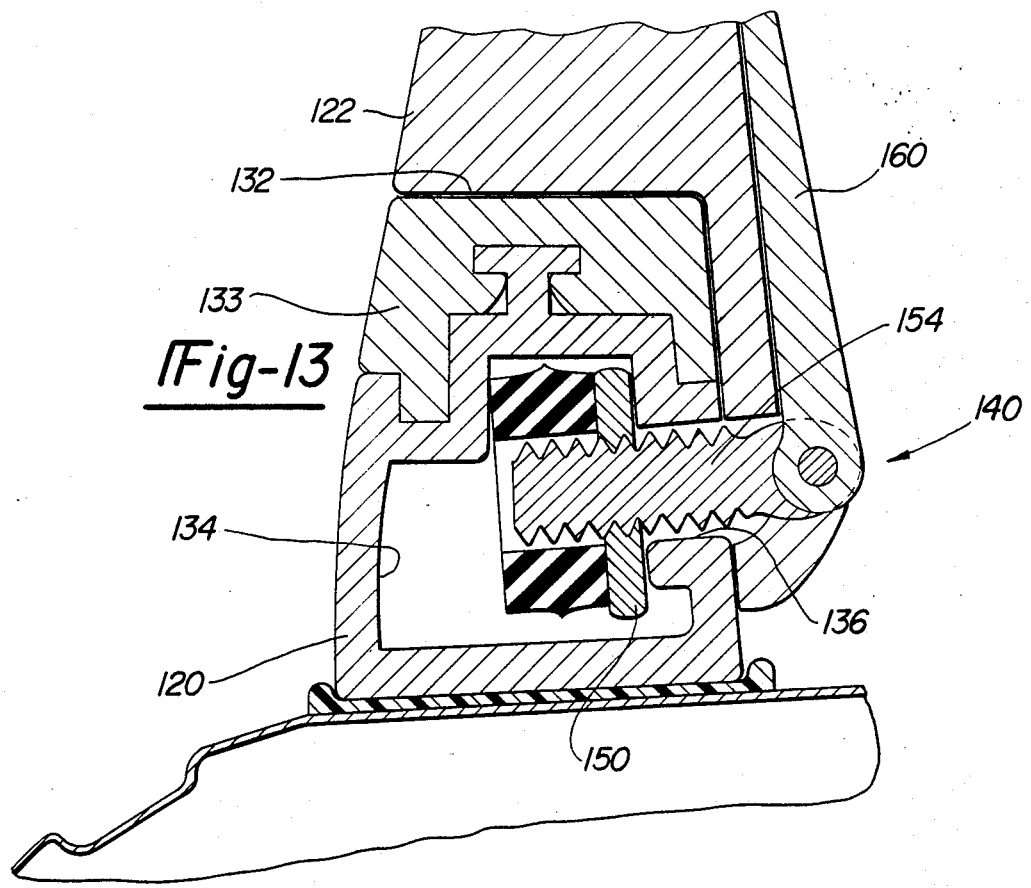
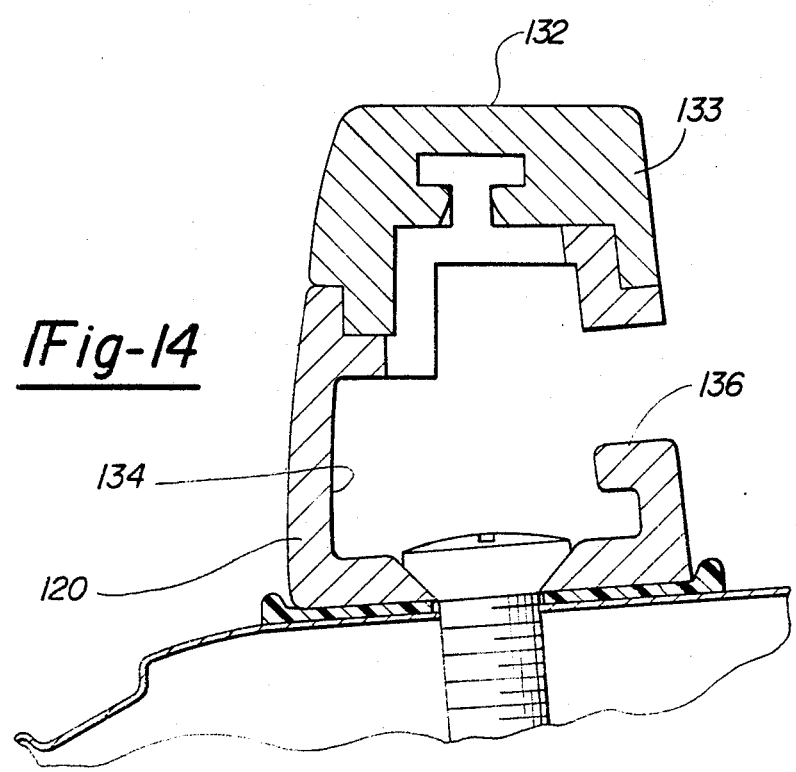

ADJUSTABLE CROSS RAIL FOR LUGGAGE CARRIER

BACKGROUND OF THE INVENTION

I. Field of the Invention

This invention relates to adjustable cross rails for a luggage carrier which can be nested together during non-use to improve aerodynamics and, in particular, to a release mechanism formed in the support stanchions of the cross rail which permit selective release and adjustment of the stanchion and rail. The cross rails are also provided with adjustable tie-down loops which are matingly received by the other rail when brought together.

II. Description of the Prior Art

Designers are continually striving to improve the aerodynamic properties of vehicles while maintaining their functionality and appearance. Luggage carriers have long been utilized on vehicles to provide additional storage space. However, the raised luggage carrier can induce drag as air travels across the vehicle roof particularly in early luggage racks which included a purely functional rectangular configuration. These luggage racks could not be accommodated to the cargo size and therefore securement of the load proved difficult.

Adjustable or removable luggage carriers were developed to permit the user to adjust the size and configuration of the rack to the load to be carried or to remove the carrier when not in use. In such assemblies, the cross rails are mounted to longitudinal tracks secured to the vehicle surface. The tracks allow adjustment of the cross rails such that the space therebetween can be varied in accordance with the load size. The tracks may include access means for selective removal of the cross rails from the roof of the vehicle. Past known adjustable cross rails include means for locking the support stanchion in the desired position. Various locking assemblies have been developed including a manually rotatable knob which draws a cam member against the track or key locks which release the support stanchion and cross rail. However, these past known mechanisms have been found unsatisfactory either because they are inconvenient to the user or they induce unacceptable drag as the vehicle travels. Vehicle owners tend to misplace keys used to release key-lock stanchions while knob-operated mechanisms extend outwardly beyond the aerodynamic outline of the cross rail and support stanchion reducing the aerodynamic properties. It has also been found that the sleek, continuous outline is preferred by vehicle owners. Finally, it has long been known that vehicle performance can be improved by an aerodynamic foil positioned on the vehicle roof near the back of the vehicle. For this reason, it would be advantageous if the cross rails, when not in use, could be brought together to substantially form an aerodynamic wing.

SUMMARY OF THE PRESENT INVENTION

The present invention overcomes the disadvantages of the prior known luggage carriers by providing an adjustable cross rail with support stanchions which includes a release mechanism which conforms to the configuration of the stanchion and provides simple release of the rail for adjustment. The cross rails are also configured to permit nested connection of the rails.

The luggage carrier of the present invention includes a pair of longitudinal tracks secured to the vehicle surface and having a top surface to which the support stanchion and cross rail are mounted. The cross rail includes a pair of support stanchions directly mounted to the tracks and a rail member extending between the support stanchions. The rail members are provided with a series of tie-down loops which are laterally adjustable along a slot formed in the rail member. The tie-down loops may be positioned downwardly so that they do not interfere with bringing the cross rails together or they may be directed inwardly towards the other cross rail in which case the loop nests within the groove of the other rail member when the cross rails are brought together. With either embodiment, the cross rails are capable of being brought into contiguous engagement to form an aerodynamic wing.

The release mechanism disposed within the support stanchion includes a lock plate positioned within the track and adapted to be drawn upwardly against the track surface to positionally capture the track surface against the bottom of the stanchion, The lock plate is vertically adjustable using a threaded member which, when rotated, raises and lowers the lock plate. The threaded member extends into the stanchion, particularly an exposed cavity of the stanchion. The cavity is specifically configured to receive the control lever attached to the threaded member for rotation thereof. In a first embodiment, the control lever consists of a camming lever which can be cammingly locked into the cavity and can be pivoted out of the cavity for rotation of the threaded member. In a second embodiment, the control lever consists of a wrenching lever which selectively engages a corresponding nut mounted to the threaded member for rotation thereof in order to adjust the lock plate. The wrenching lever can be pivoted into its cavity and a release pin is provided for forcing the wrench lever from the cavity. Thus, both embodiments provide control levers which closely conform to the configuration of the support stanchion to provide a sleek and aerodynamic assembly. The longitudinal track to which the cross rails are mounted may include an enlarged opening having a cover to facilitate insertion and removal of the lock plate within the track thereby permitting selective removal of the cross rails.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 13 is a cross-sectional perspective of a third embodiment of the present invention;

FIG. 14 is a cross-sectional perspective of the mounting track of the third embodiment of the invention;

DETAILED DESCRIPTION OF A PREFERRED EMBODIMENT OF THE PRESENT INVENTION

Figure 1:
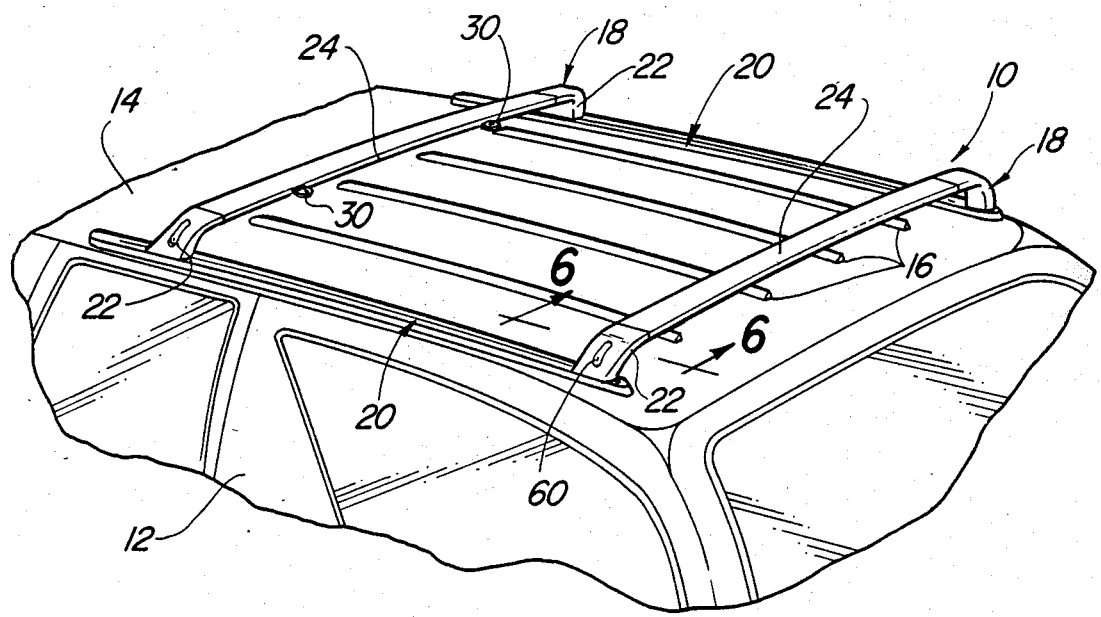
FIG. 1 is an elevated perspective of a first embodiment of the luggage carrier of the present invention on a vehicle, the cross rails in spaced apart relation.

Referring to the drawings, there is shown a luggage carrier 10 embodying the present invention secured to a vehicle 12. The carrier 10 is shown mounted to the roof surface 14 of the vehicle 12 although the carrier 10 could also be mounted to the rear deck. The luggage carrier 10 generally comprises a plurality of longitudinal slats 16 fixedly secured to the vehicle surface 14 and a pair of adjustable rails 18. The rails 18 are mounted to side tracks 20 fixedly secured to the vehicle surface 14 in longitudinal parallel arrangement. Each of the rails 18 are substantially identical but are mounted to the tracks 20 in mirror-image to facilitate mating of the rails 18 as shown in FIG. 2 and as will be subsequently described.

Figure 7:
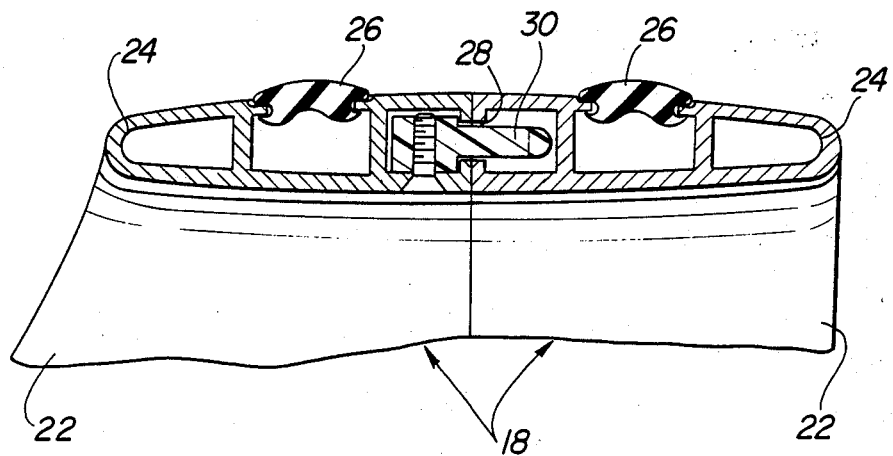
FIG. 7 is a cross-sectional perspective of the cross rail taken along line 7—7 of FIG. 2.
Figure 12:
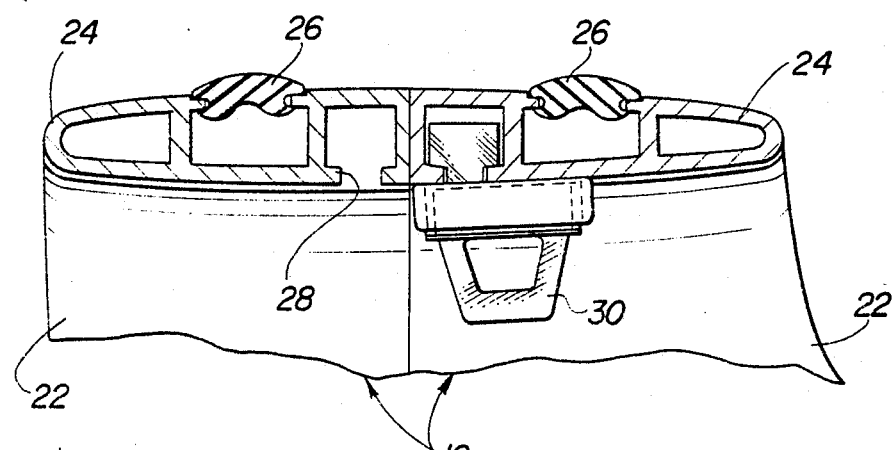
FIG. 12 is a cross-sectional perspective of the cross rail taken along line 12—12 of FIG. 9.
Figure 15:
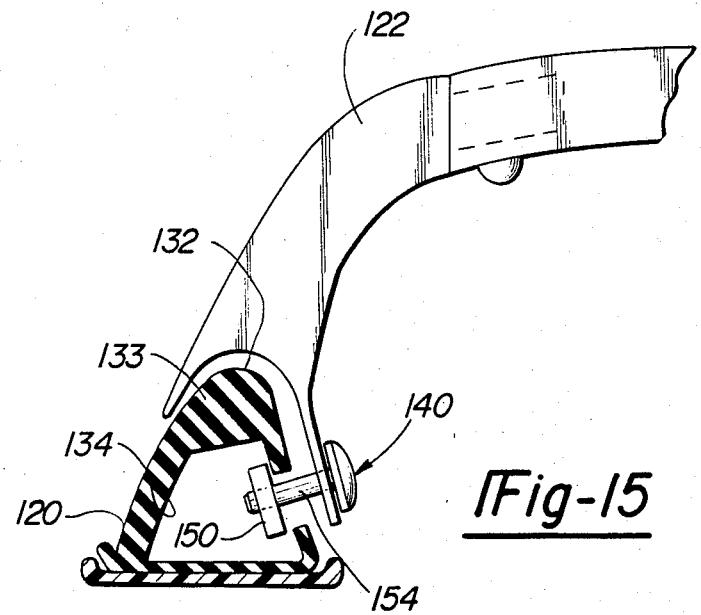
FIG. 15 is a partial cross-sectional perspective of a variant of the third embodiment of the present invention.
Figure 16:
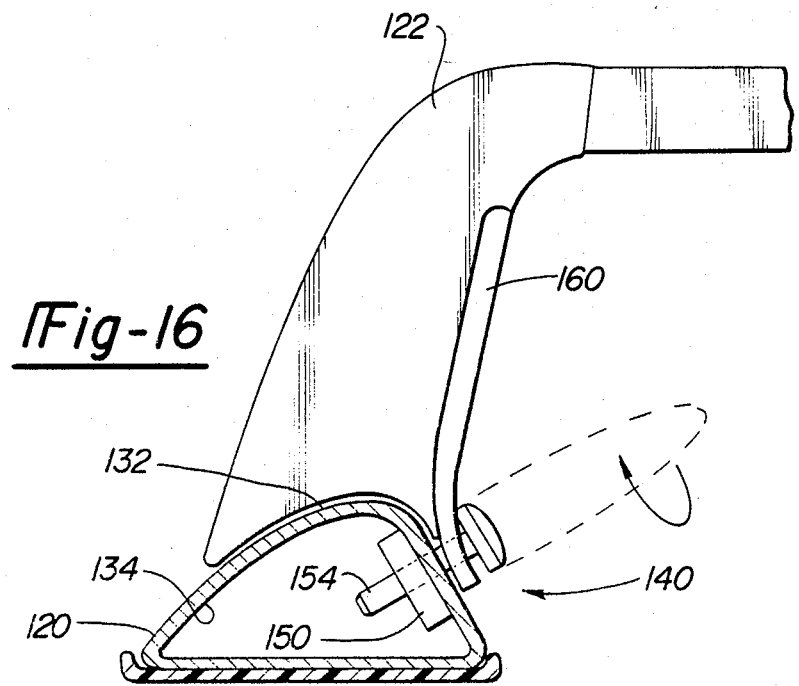
FIG. 16 is a partial cross-sectional perspective of a still further variant of the third embodiment of the present invention.

The support rails 18 include support stanchions 22 adjustably mounted to the tracks 20 and a cross rail 24 extending between the stanchions 22 supported in spacial relation above the vehicle surface 14. As best shown in FIGS. 7 and 12, the cross rail 24 is of an extruded construction and may include rub strips 26. The cross rail 24 preferably includes a slot 28 formed the entire length of the rail 24 and adapted to receive a tie loop 30 for securing a load within the carrier 10. The tie loops 30 may be fixedly secured as shown in FIG. 7 or may be slidably adjustable along the slot 28 the length of the rail 24. Furthermore, the tie loop 30 may extend downwardly beneath the rail 24 from a slot 28 open to the bottom of the rail 24 as shown in FIG. 12 or may extend inwardly as shown in FIG. 7 in which case the tie loops 30 will nest within the slot 28 in the other cross rail 24 when the rails 18 are brought together. Both embodiments facilitate flexibility in securing loads of different sizes and configurations.

Figure 2:
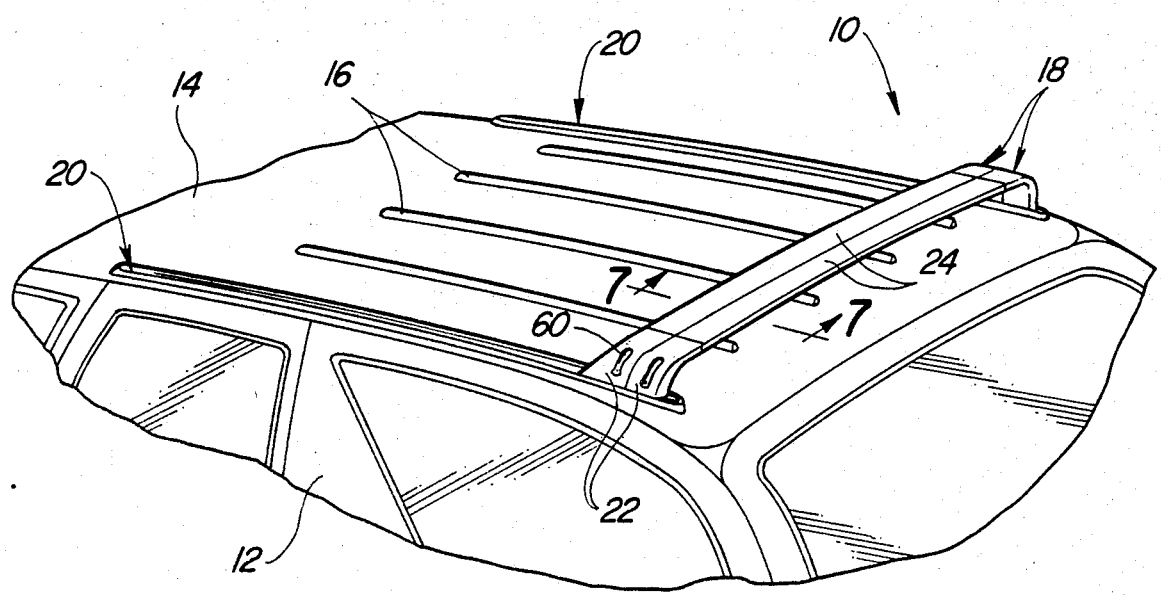
FIG. 2 is an elevated perspective of the first embodiment of the present invention with the cross rails in contiguous engagement.

The support rails 18 preferably include a front and a rear rail which are slidably adjustable along the length of the tracks 20 between a spaced apart position as shown in FIG. 1 and an adjacent position as shown in FIG. 2. It is intended that the rails 18 be spaced apart to accommodate and secure the intended load and brought into adjacent contact proximate the rear of the vehicle when no load is being transported to improve the aerodynamics of the vehicle 12. The cooperating contact between the front and rear rails 18 forms an aerodynamic wing for the vehicle 12.

Figure 3:
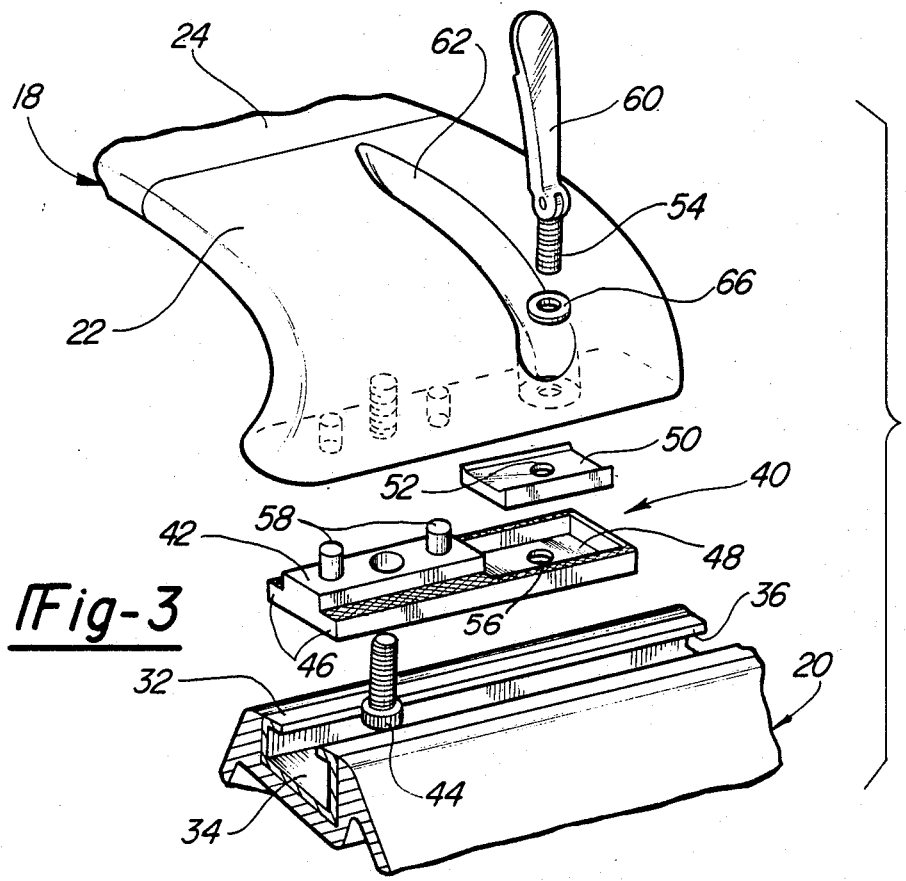
FIG. 3 is an exploded perspective of the support stanchion and longitudinal track with the release mechanism of the first embodiment.
Figure 4:
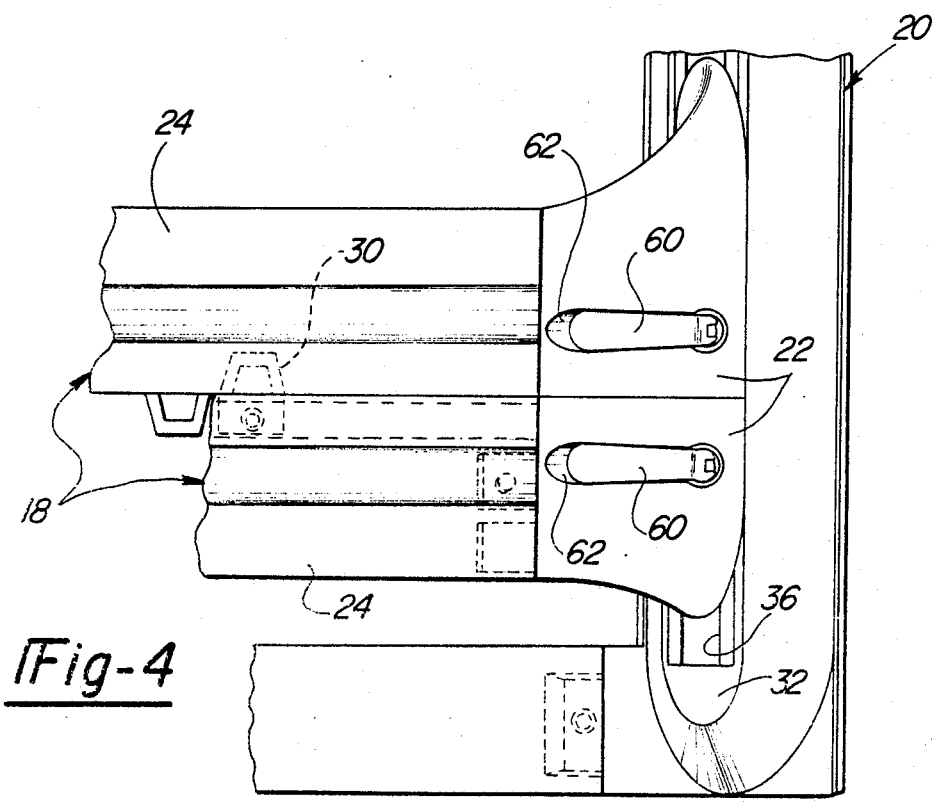
FIG. 4 is a partial top view of the first embodiment of the luggage carrier.
Figure 8:
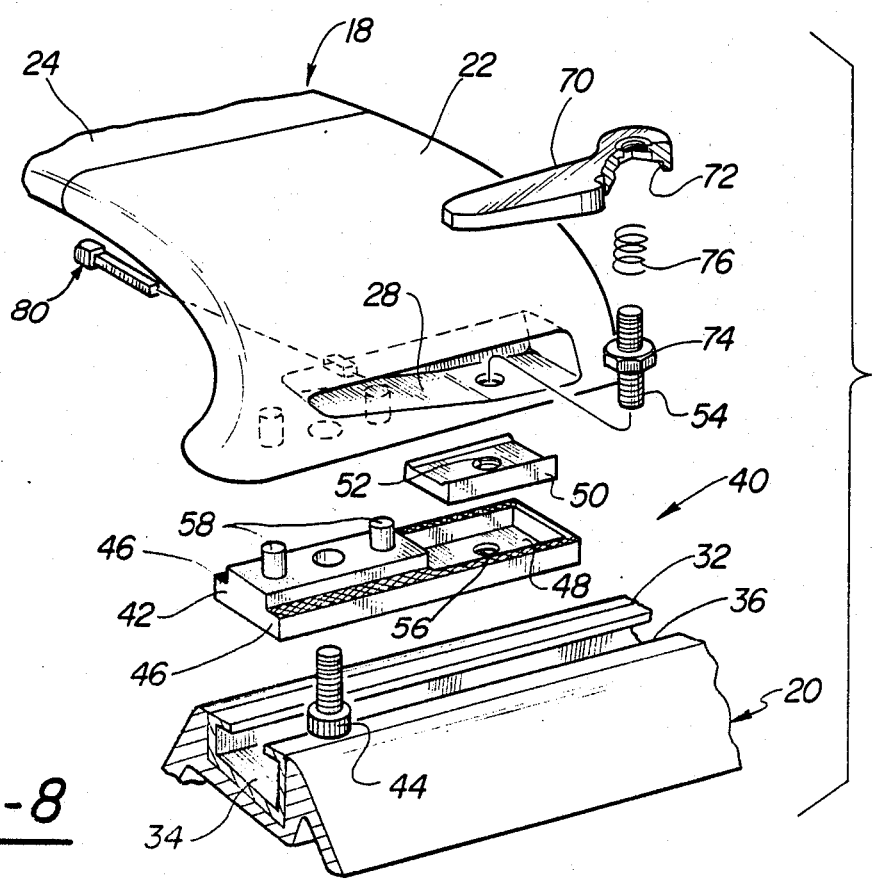
FIG. 8 is an exploded perspective of the support stanchion and longitudinal track with the release mechanism of a second embodiment of the present invention.
Figure 9:
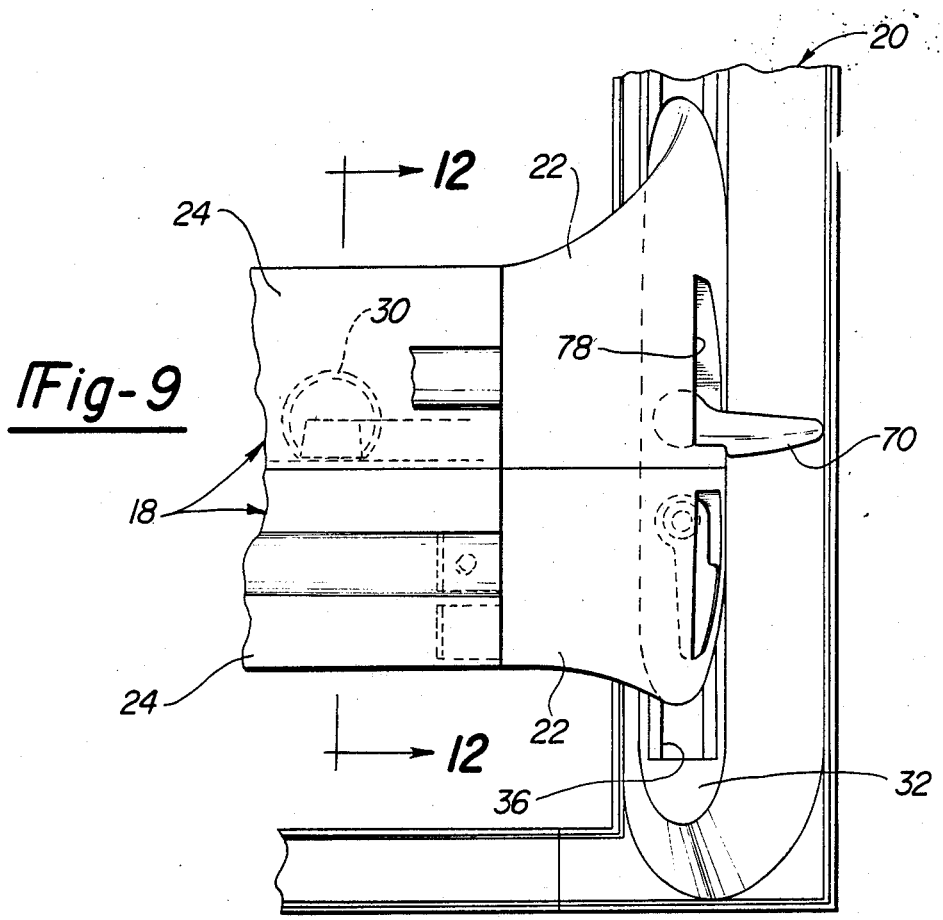
FIG. 9 is a partial top view of the second embodiment of the luggage carrier.
Figure 10:
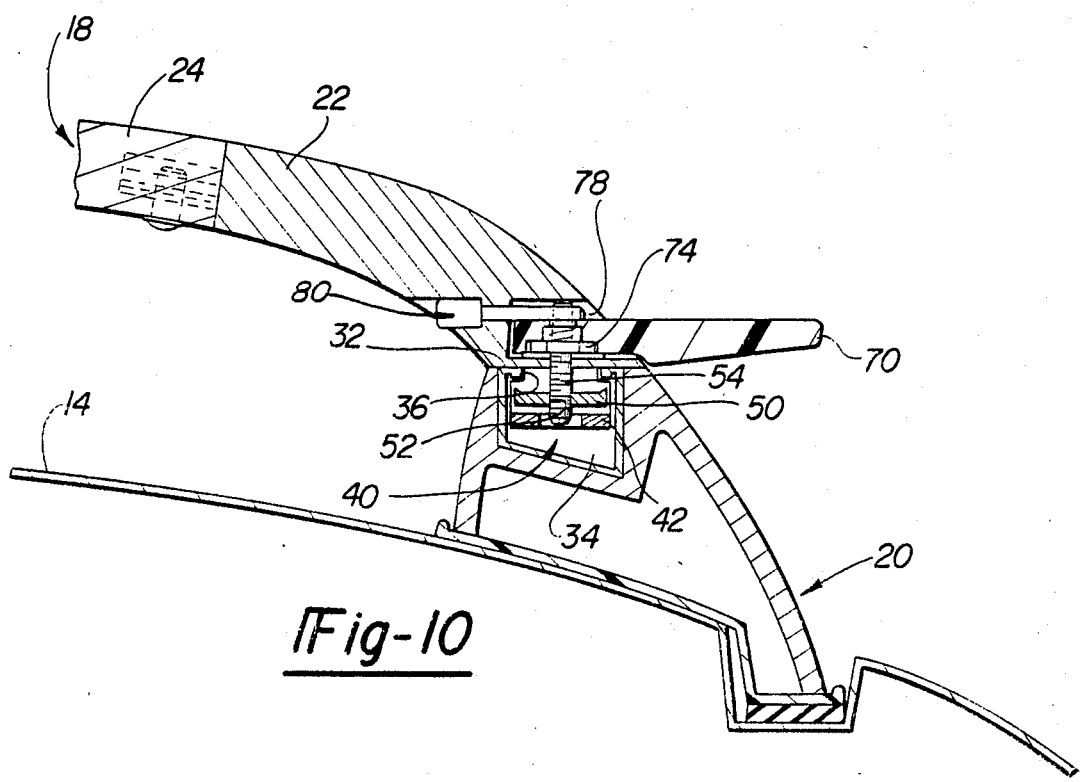
FIG. 10 is a cross-sectional perspective of the second embodiment showing the release mechanism in the unlocked position.
Figure 11:
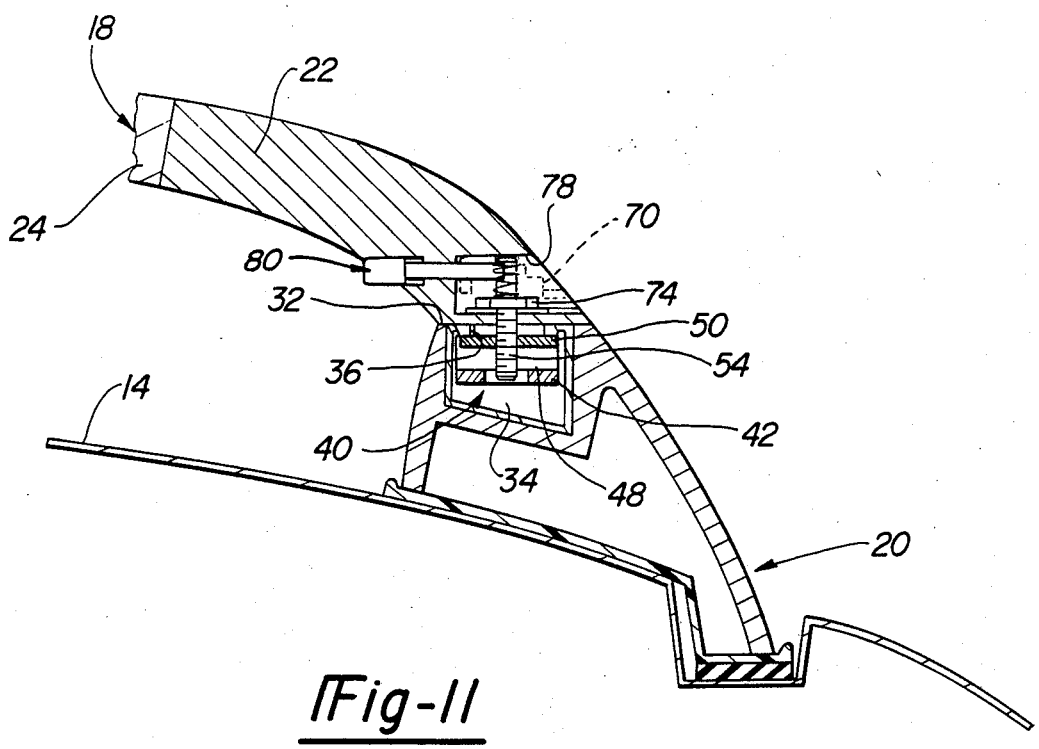
FIG. 11 is a cross-sectional perspective of the second embodiment showing the release mechanism in the locked position.

The rails 18 are each adjustably and removably mounted to the tracks 20 which are fixedly secured to the vehicle surface 14. The tracks 20 include an upper support surface 32 upon which the stanchions 22 are supported and an elongated channel 34 extending through the interior of the track 20 the length of the track 20. The interior channel 34 is open to the exterior of the track 20 through a channel slot 36 formed in the track 20 and extending substantially the length of the track 20 to facilitate sliding adjustment of the rails 18 along the track 20. The channel slot 36 may be formed in the upper support surface of the track 20 such that the channel 34 is open to the top of the track 20 as shown in FIGS. 3 and 8 or, alternatively, the slot 36 may be formed in a side wall of the track 20 such that the channel 34 is open either towards the interior or the exterior of the carrier 10. An example of a channel 34 open to the interior of the carrier 10 is shown in FIGS. 13 through 16.

The support stanchions 22 are provided with a locking mechanism 40 which cooperates with the mounting track 20 to selectively lockingly secure the stanchion 22 along the length of the track 20. In the embodiments of FIGS. 3-6 and FIGS. 8-11, the locking mechanism 40 includes a retaining bracket 42 secured to the underside of the stanchion 22 by a retaining bolt 44. The retaining bracket 42 has an inverted "T" configuration with outwardly extending flanges 46 which extend beyond the edges of the channel slot 36 to prevent removal of the retaining bracket 42 through the slot 36 and therefore removal of the stanchion 22 from the track 20. The retaining bracket 42 fixedly secured to the stanchion 22 also includes a cavity 48 adapted to receive a lock plate 50. The lock plate 50 also has a width greater than the width of the channel slot 36 and includes a threaded aperture 52 adapted to receive a threaded member 54. The lock plate 50 is positionally captured within the cavity 48 but will travel along the axis of the threaded member 54 as the threaded member 54 is rotated. The retaining bracket 42 may include an aperture 56 to receive the end of the threaded member 54 while stabilizing the retaining bracket 42. Pegs 58 may also be provided on either the retaining bracket 42 as shown or on the underside of the stanchion 22 to further stabilize the retaining bracket 42 with respect to the stanchion 22.

Figure 5:
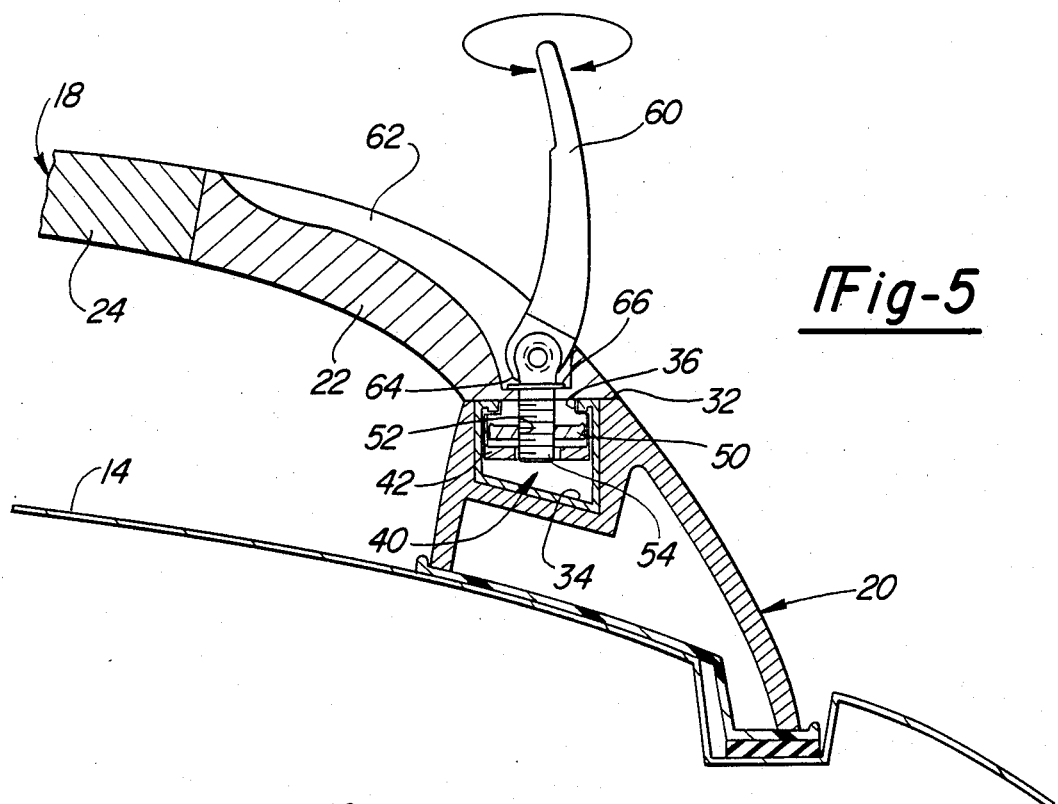
FIG. 5 is a cross-sectional perspective of the first embodiment showing the release mechanism in the unlocked position.
Figure 6:
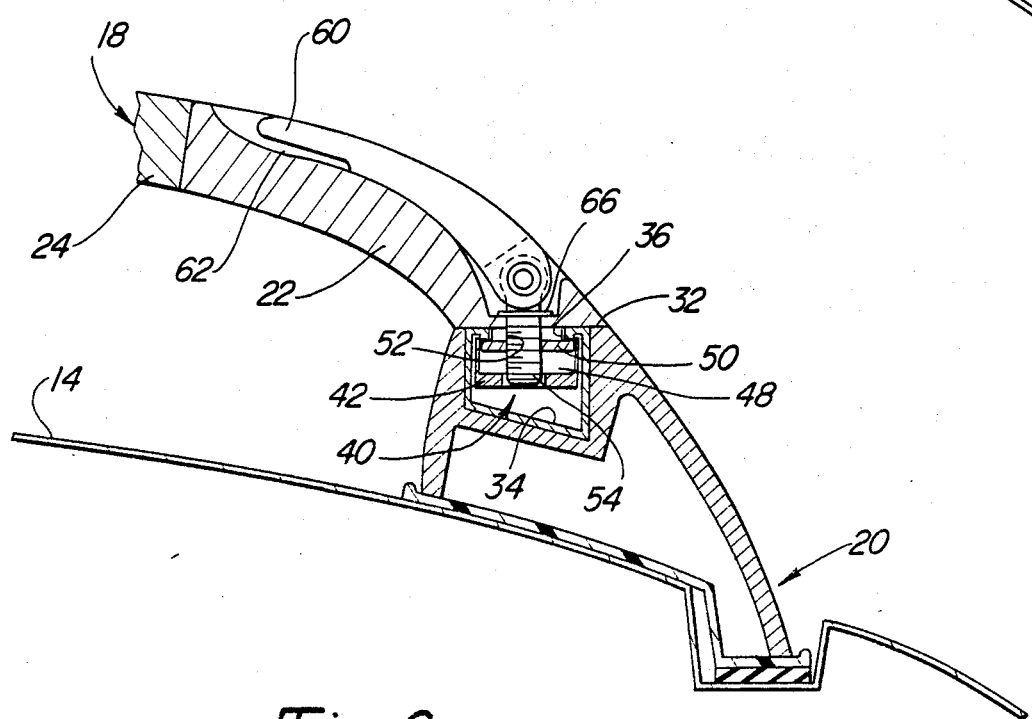
FIG. 6 is a cross-sectional perspective of the first embodiment taken along line 6—6 of FIG. 1 showing the release mechanism in the locked position.

FIGS. 3 through 6 show a first embodiment of a manual control means for the threaded member 54 in the form of a cam lever 60 pivotally attached to the threaded member 54. The cam lever 60 is stored within a similarly configured cavity 62 such that the cam lever 60 closely conforms and, in fact, forms a portion of the outer surface of the stanchion 22 to improve the aerodynamic properties of the carrier 10 while also providing an aesthetically appealing configuration. When it becomes necessary to release the locking mechanism 40, the cam lever 60 is moved from its stored position shown in FIG. 6 by pivoting the lever 60 from the cavity 62. The lever 60 can then be utilized to rotate the threaded member 54 as shown in FIG. 5. The lever 60 includes a camming surface 64 which cooperates with the washer 66 to essentially lock the lever 60 within the cavity 62 during storage. The camming action of the lever 60 also ensures that the stanchion 22 is securely locked into place by drawing the lock plate 50 against the interior wall of the track 20.

FIGS. 8 through 11 show a second embodiment of a manual control means for the threaded member 54 in the form of a wrench lever 70 having a wrench opening 72 coaxially mounted to the threaded member 54. The threaded member 54 is provided with a fixed nut 74 adapted to be selectively matingly received within the wrench opening 72 of the wrench lever 70. A spring 76 is provided to bias the wrench lever 70 upwardly such that the nut 74 is removed from the wrench opening 72. In this manner, the wrench lever 70 must be positively positioned over the nut 74 to rotate the threaded member 54. The stanchion 22 includes a cavity 78 adapted to receive the wrench lever 70 such that the lever 70 can be stored within the stanchion 22 to reduce wind resistance while improving the aesthetic appeal of the carrier 10. Because the wrench lever 70 closely conforms to the cavity 78, a release pin 80 is provided to force the lever 70 from the cavity 78. When it becomes necessary to release the locking mechanism 40, the wrench lever 70 is moved from its stored position shown in FIG. 11 by pushing on the release pin 80 and pivoting the lever 70 from the cavity 78. The wrench lever 70 must then be forced downwardly against the spring 76 to engage the nut 74 of the threaded member 54. Once the wrench lever 70 and threaded member 54 are pivoted through its full range, the wrench 70 can be raised, returned, and re-engaged with the nut 74 to rotate the threaded member 54 further.

Both of these embodiments operate under the same principle in that as the threaded member 54 is rotated, the lock plate 50 will travel along the axis of the threaded member in a corresponding direction. Thus, as the threaded member 54 is rotated clockwise, the lock plate 50 will be drawn upwardly into clamping engagement with the track 20 to secure the stanchion in that particular position. In contrast, as the threaded member 54 is rotated counter-clockwise the lock plate 50 will lower into the cavity 48 of the retaining bracket 42 to release the stanchion 22 for movement along the track 20 or complete removal therefrom. Accordingly, the rail 18 can be positioned anywhere along the tracks 20 to accommodate different load configurations or to improve the aerodynamics of the vehicle 12.

The embodiments of FIGS. 13 through 16 show a side engaging locking mechanism 140 to secure the stanchions 122 to the side tracks 120. The tracks 120 include an upper support surface 132 which is formed by a rail cap 133 to enhance the sliding engagement with the stanchions 122. The track 120 includes an inner channel 134 although the channel slot 136 is formed in a side wall of the track 120 and not in the upper support surface as in the previous embodiments. The threaded member 154 extends through the channel slot 136 to threadably engage the lock plate 150. The threaded member 154 is rotated using a cam lever 160 which when stored forms a portion of the inwardly disposed wall of the stanchion 122. Operation of the locking mechanism 140 is similar to the other embodiments except that the lock plate 150 is drawn laterally upon rotation of the threaded member 154 to clampingly engage the track 120.

Thus, the present invention provides a convenient, aesthetically appealing, and aerodynamic support stanchion for a luggage carrier which allows longitudinal adjustment of the rails along the vehicle surface while ensuring positive locking of the rail when necessary. Alternatively, the rails may be removed from the tracks when not in use.

The foregoing detailed description has been given for clearness of understanding only and no unnecessary limitations should be understood therefrom as some modifications will be obvious to those skilled in the art without departing from the scope and spirit of the appended claims.

We claim:

1. A luggage carrier for a vehicle adapted to be mounted to an exterior surface of the vehicle, said carrier comprising:
   at least two mounting tracks adapted to be fixedly secured to the vehicle surface, said tracks including an upper support surface and an elongated interior channel open to the exterior of said track and extending substantially the length of said track, said channel opening formed by inwardly disposed flanges in an engaging wall of said mounting track;
   front and rear support rails adjustably mounted to said tracks, said support rails each including support stanchions having continuous arcuate exterior surfaces and being slidably mounted to said support surface of said tracks and a cross rail attached to and extending between said support stanchions in spaced relation to the vehicle surface; and
   a locking mechanism disposed within each of said support stanchions and cooperable with said mounting track to lockingly secure said support rails to said mounting tracks, said locking mechanism including a lock plate assembly disposed within said channel and rotatable manual control means attached to a threaded member extending through said channel opening and threadably connected to said lock plate assembly such that rotation of said manual control means in a first direction to rotate said threaded member in a first direction about its axis selectively draws said lock plate assembly into locking engagement with said engaging wall of said channel wherein said flanges of said engaging wall are lockingly captured between said lock plate assembly and said support stanchion and rotation of said manual control means in a second direction to rotate said threaded member in a second direction about its axis selectively releases said engaging wall of said channel, said manual control means being selectively seated within a cavity formed in one of said arcuate exterior surfaces of said support stanchion to form a portion of said one arcuate exterior surface of said stanchion.

2. The luggage carrier as defined in claim 1 wherein said manual control means includes a control handle attached to said threaded member.

3. The luggage carrier as defined in claim 2 wherein said control handle comprises a cam lever pivotably secured to said threaded member, said cavity of said support stanchion closely conforming to the configuration of said cam lever whereby said cam lever is selectively received within said cavity such that said cam lever forms a portion of the exterior surface of said stanchion.

4. The luggage carrier as defined in claim 2 wherein said threaded member includes a rotation head disposed within said stanchion, said control handle comprising a wrench lever selectively engageable with said rotation head of said threaded member to rotate said threaded member, said cavity of said support stanchion closely conforming to the configuration of said wrench lever whereby said wrench lever is selectively received within said cavity such that said wrench lever forms a portion of the exterior surface of said stanchion.

5. The luggage carrier as defined in claim 4 and further comprising pin means engageable with said wrench lever to pivot said wrench lever from said cavity.

6. The luggage carrier as defined in claim 2 wherein said lock plate assembly includes a retainer and said lock plate is movably disposed within said retainer, said retainer is fixedly secured to said stanchion and has retainer flanges slidingly disposed within said channel opening, said lock plate being adjustably attached to said threaded member, and clampingly engageable with said flanges of said engaging wall for lockingly securing said support stanchions.

7. The luggage carrier as defined in claim 6 wherein said elongated channel opening is formed in said upper support surface, said locking mechanism extending through the bottom of said support stanchion to clampingly engage said flanges of said engaging wall between said lock plate and the bottom of said support stanchion.

8. The luggage carrier as defined in claim 1 and further comprising tie loops slidably disposed within elongated channels formed in said cross rails.

9. The luggage carrier as defined in claim 8 wherein said channels are formed within an inwardly disposed surface of said cross rails, said tie loops of one of said support rails being restably received within said slot of an other of said support rail when said rails are slidably adjusted into adjacent contact.

10. A luggage carrier for a vehicle adapted to be mounted to an exterior surface of the vehicle, said carrier comprising:
    at least two mounting tracks adapted to be fixedly secured to the vehicle surface, said tracks including an upper support surface and an elongated interior channel open to the exterior of said track, said channel opening extending substantially the length of said track and formed in an engaging wall of said mounting track by inwardly disposed flanges;
    front and rear support rails slidably mounted to said tracks, said support rails each including support stanchions having continuous arcuate exterior surfaces and being
    a locking mechanism disposed within each of said support stanchions and clampingly cooperable with said channel to selectively secure said support rails to said mounting tracks wherein said rails may be slidably repositioned along said tracks upon loosening of said locking mechanism;
    said locking mechanism including a rotatable cam lever pivotably connected to a threaded member which is threadably connected to a lock plate assembly disposed within said channel, said lock plate assembly including a lock plate positionally captured therein for clampingly engaging said flanges of said engaging wall of said mounting track against said support stanchion upon rotation of said cam lever and threaded member in a first direction about the axis of said threaded member and said lock plate of said lock plate assembly releasing said flanges of said engaging wall upon rotation of said cam lever and threaded member in a second direction about the axis of said threaded member for slidable adjustment of said support stanchions along said mounting track, said threaded member moving through a threaded aperture of said lock plate as said cam lever and threaded member are rotated to move said lock plate into and out of locking engagement with said engaging wall of said mounting track;
    said support stanchion including a cavity formed in one of said arcuate exterior surfaces thereof, said cam lever cavity to form a portion of said one arcuate exterior surface of said stanchion.

11. The luggage carrier as defined in claim 10 wherein said lock plate assembly includes a fixed retainer positioned within said track channel and said lock plate is movably disposed within said retainer, said retainer is secured to said stanchion and has retainer flanges slidingly disposed within said channel opening to prevent removal of said stanchion from said support surface said lock plate being clampingly engageable with said flanges of said engaging wall for lockingly securing said support stanchions upon rotation of said cam lever.

12. The luggage carrier as defined in claim 11 wherein said mounting track includes access means communicating with said channel and comprising an opening having a width greater than the width of said channel opening for selective removal of said lock plate assembly from said channel and cover means for selectively closing said opening.

13. The luggage carrier as defined in claim 10 and further comprising tie loops slidably disposed within elongated channels formed in said cross rails, said tie loops of one of said support rails nestably received within said channel of another of said support rails when said front and rear support are slidably adjusted into adjacent contact.

14. A luggage carrier for a vehicle adapted to be mounted to an exterior surface of the vehicle, said carrier comprising:
    at least two mounting tracks adapted to be fixedly secured to the vehicle surface, said tracks including an upper support surface and an elongated interior channel open to the exterior of said track, said channel opening extending substantially the length of said track and formed by inwardly disposed flanges in an engaging wall of said mounting track;
    front and rear support rails slidably mounted to said tracks, said support rails each including support stanchions having continuous arcuate exterior surfaces and being adjustably mounted to said support surface of said tracks and a cross rail attached to and extending between said support stanchions in spaced relation to the vehicle surface; and
    a locking mechanism disposed within each of said support stanchions and clampingly cooperable with said channel to selectively secure said support rails to said mounting tracks wherein said rails may be slidably repositioned along said tracks upon loosening of said locking mechanism;
    said locking mechanism including a rotatable wrench lever connected to a threaded member which is threadably connected to a lock plate assembly disposed within said channel, said lock plate assembly including a lock plate positionally captured therein for clampingly engaging said flanges of said engaging wall of said mounting track against said support stanchion upon rotation of said wrench lever and threaded member in a first direction about the axis of said threaded member and said lock plate of said lock plate assembly releasing said flanges at said engaging wall upon rotation of said wrench lever and threaded member in a second direction about the axis of said threaded member for slidable adjustment of said support stanchions along said mounting tracks;

said support stanchion including a cavity formed in one of said arcuate exterior surfaces, said wrench lever being selectively disengageable from rotation with said threaded member whereby said wrench lever is separately rotatable to seat within said cavity to form a portion of said one arcuate exterior surface of said stanchion.

15. The luggage carrier as defined in claim 14 wherein said threaded member includes a rotation head, said wrench lever is selectively engageable with said rotation head of said threaded member to rotate said threaded member, said wrench lever including spring means biasing said wrench lever from engagement with said rotation head.

16. The luggage carrier as defined in claim 15 and further comprising pin means engageable with said wrench lever to pivot said wrench lever from said cavity.

17. The luggage carrier as defined in claim 14 wherein said lock plate assembly includes a fixed retainer positioned within said track channel and said lock plate is movably disposed within said retainer, said retainer is fixedly secured to said stanchion and has retainer flanges disposed within said channel opening to prevent removal of said stanchion from said support surface, said lock plate being clampingly engageable with said flanges of said engaging wall for lockingly securing said support stanchions upon rotation of said wrench lever and threaded member.

18. The luggage carrier as defined in claim 17 wherein said mounting track includes access means communicating with said channel and comprising an opening having a width greater than the width of said channel opening for selective removal of said lock plate assembly from said channel and cover means for selectively closing said opening.

19. The luggage carrier as defined in claim 14 and further comprising tie loops slidably disposed within elongated channels formed in said cross rails said tie loops of one of said support rails nestably received within said channel of an other of said support rails when said front and rear support rails are slidably adjusted into adjacent contact.

20. A luggage carrier for a vehicle adapted to be mounted to an exterior surface of the vehicle, said carrier comprising:

at least two mounting tracks adapted to be fixedly secured to the vehicle surface, said tracks including an upper support surface and an elongated interior channel open to the exterior of said track and extending substantially the length of said track, said channel opening formed by inwardly disposed flanges in an engaging wall of said mounting track;

front and rear support rails adjustably mounted to said tracks, said support rails each including support stanchions slidably mounted to said support surface of said tracks and a cross rail attached to and extending between said support stanchions in spaced relation to the vehicle surface, each of said cross rails including an elongated channel extending substantially the length of said cross rail and formed in an inwardly disposed surface of said cross rails;

at least one tie loop slidably mounted within said channel of said cross rails, said at least one tie loop of one of said support rails being nestably received within said channel of the other of said support rails when said rails are slidably adjusted into adjacent contact; and a locking mechanism disposed within each of said support stanchions and cooperable with said mounting track to lockingly secure said support rails to said mounting tracks, said locking mechanism including a lock plate assembly disposed within said channel of said mounting track and manual control means extending through said channel opening and threadably connected to said lock plate assembly, said manual control means adapted to selectively draw said lock plate assembly into locking engagement with said engaging wall of said channel wherein said flanges of said engaging wall are lockingly captured between said lock plate assembly and said support stanchion, said manual control means being selectively seated within said support stanchion to form a portion of the exterior surface of said stanchion.

* * * * *